United States Patent
Klimeck et al.

(10) Patent No.: US 11,093,667 B2
(45) Date of Patent: Aug. 17, 2021

(54) METHOD AND SYSTEM FOR REALISTIC AND EFFICIENT SIMULATION OF LIGHT EMITTING DIODES HAVING MULTI-QUANTUM-WELLS

(71) Applicant: PURDUE RESEARCH FOUNDATION, West Lafayette, IN (US)

(72) Inventors: Gerhard Klimeck, West Lafayette, IN (US); Tillmann Kubis, West Lafayette, IN (US); Junzhe Geng, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 606 days.

(21) Appl. No.: 15/986,337

(22) Filed: May 22, 2018

(65) Prior Publication Data
US 2018/0336302 A1 Nov. 22, 2018

Related U.S. Application Data

(60) Provisional application No. 62/509,318, filed on May 22, 2017.

(51) Int. Cl.
*G06F 30/20* (2020.01)
*H01L 33/00* (2010.01)
(Continued)

(52) U.S. Cl.
CPC ............ *G06F 30/20* (2020.01); *G06F 30/367* (2020.01); *H01L 33/0025* (2013.01);
(Continued)

(58) Field of Classification Search
CPC .... G06F 30/20; G06F 30/367; G06F 2111/10; H01L 33/0025; H01L 33/06;
(Continued)

(56) References Cited

U.S. PATENT DOCUMENTS 9,269,876 B2 * 2/2016 David .................... H01L 33/32
9,722,144 B2 * 8/2017 Santhanam ......... H01L 33/0004
(Continued)

FOREIGN PATENT DOCUMENTS

CN 103247728 A * 8/2013 ............. H01L 33/06
CN 105051921 A * 11/2015 ............. H01L 33/06

OTHER PUBLICATIONS

Junzhe Geng, "Multi-scale quantum transport modeling of light emitting diodes", a dissertation submitted to Purdue University, Jun. 2016.*
(Continued)

*Primary Examiner* — Kandasamy Thangavelu
(74) *Attorney, Agent, or Firm* — Maginot, Moore & Beck LLP

(57) ABSTRACT

The disclosure develops a multi-scale model that partitions the device into different spatial regions where the high carrier domains are treated as reservoirs in local equilibrium and serve as injectors and receptors of carriers into the neighboring reservoirs through tunneling and thermionic emission. The nonequilibrium Green's function (NEGF) formalism is used to compute the dynamics (states) and the kinetics (filling of states) in the entire extended complex device. The local density of states in the whole device is computed quantum mechanically within a multi-band tight binding Hamiltonian. The model results agree with experimental I-V curves quantitatively.

20 Claims, 9 Drawing Sheets

(51) Int. Cl.
   *H01L 33/06* (2010.01)
   *G06F 30/367* (2020.01)
   *H01L 33/14* (2010.01)
   *G06F 111/10* (2020.01)

(52) U.S. Cl.
   CPC .......... *H01L 33/06* (2013.01); *G06F 2111/10* (2020.01); *H01L 33/145* (2013.01)

(58) Field of Classification Search
   CPC ... H01L 33/145; H01L 33/32; H01L 33/0004; H01L 33/30; H01L 21/02639; B82Y 20/00
   See application file for complete search history.

(56) References Cited

U.S. PATENT DOCUMENTS

| | | | | |
|---|---|---|---|---|
| 2010/0327783 | A1* | 12/2010 | Tansu | B82Y 20/00 315/363 |
| 2013/0240348 | A1* | 9/2013 | Mi | H01L 21/02639 204/157.5 |
| 2015/0187991 | A1* | 7/2015 | McGroddy | H01L 33/30 257/13 |

OTHER PUBLICATIONS

Junzhe Geng et al., "NEMO5: Realistic and Efficient NEGF Simulations of GaN Light-Emitting Diodes", Proceedings of SPIE, Feb. 2017.*

Friedhard Romer et al., "Luminescence distribution in the multi quantum well region of III-nitride light emitting diodes", Proceedings of SPIE, Feb. 2017.*

Friedhard Romer et al., "Auger recombination and leakage in InGaN/GaN quantum well LEDs", Proceedings of SPIE, Mar. 2014.*

David Mortin, Harvard University, "The Hamiltonian method", 2007.*

Mulvihill et al., "Combining the mapping Hamiltonian linearized semiclassical approach with the generalized quantum master equation to simulate electronically nonadiabatic molecular dynamics", J. Chem. Phys., Jul. 2019.*

Shen, Y. C., et al., Auger Recombination in InGaN Measured by Photoluminescence, Applied Physics Letters, 2007, pp. 141101, vol. 91, American Institute of Physics.

Weisbuch, C., et al., The Efficiency Challenge of Nitride Light-Emitting Diodes for Lighting, Phys. Status Solidi A, 2015, pp. 899-913, vol. 212, No. 5, Wiley-VCH Verlag GmbH & Co. KGaA.

Crawford, M. H., LEDs for Solid-State Lighting: Performance Challenges and Recent Advances, IEEE Journal of Selected Topics in Quantum Electronics, 2009, pp. 1028-1040, vol. 15, No. 4, IEEE.

Keldysh, L. V., Diagram Technique for Nonequilibrium Processes, Soviet Physics JETP, Apr. 1965, pp. 1018-1026, vol. 20, No. 4.

Lake, R. et al., Single and Multiband Modeling of Quantum Electron Transport Through Layered Semiconductor Devices, Journal of Applied Physics, 1997, pp. 7845-7869, vol. 81, No. 12, American Institute of Physics.

Kubis, T. et al., Theory of nonequilibrium quantum transport and energy dissipation in terahertz quantum cascade lasers, Physical Review B, 2009, pp. 195323, vol. 79, The American Physical Society.

Luisier, M. and Klimeck, G., Atomistic full-band simulations of silicon nanowire transistors: Effects of electronphonon scattering, Physical Review B, 2009, pp. 155430, vol. 80, The American Physical Society.

Bowen, C. et al., Quantitative simulation of a resonant tunneling diode, Journal Appl. Phys., 1997, pp. 3207-3213, vol. 81, American Institute of Physics.

Klimeck, G. et al., The effects of electron screening length and emitter quasi-bound states on the polar-optical phonon scattering in resonant tunneling diodes, Phys. Status Sol. B, Basic Res., 1997, pp. 408-411, vol. 204, No. 1.

Steiger, S. et al., Electroluminescence from a quantum-well LED using NEGF, in Proc. 13th Int. Workshop Comput. Electron., May 2009, pp. 1-4, IEEE, Beijing, China.

Shedbalkar, A. et al., Simulation of an indium gallium nitride quantum well light-emitting diode with the non-equilibrium Green's function method, Phys. Status Solidi B, 2015, pp. 158-163, vol. 253, No. 1, Wiley-VCH Verlag GmbH & Co. KGaA.

Auf Der Maur, M., Multiscale approaches for the simulation of InGaN/GaN LEDs, J Comput Electron, 2015, pp. 398-408, vol. 14, Springer Science+Business Media, New York.

Klimeck, G. et al., Quantum device simulation with a generalized tunneling formula, Appl. Phys. Lett., Oct. 1995, pp. 2539-2541, vol. 67, No. 17, American Institute of Physics.

O'Donnell, K. P. et al., Optical linewidths of InGaN light emitting diodes and epilayers, Appl. Phys. Letters, Apr. 1997, pp. 1843-1845, vol. 70, No. 14, American Institute of Physics.

Ambacher, O. et al., Absorption of InGaN Single Quantum Wells Determined by Photothermal Deflection Spectroscopy, Japanese Journal of Applied Physics, Mar. 1998, pp. 745-752, vol. 37.

Khayer, M. A. and Lake, R. K., Effects of band-tails on the subthreshold characteristics of nanowire band-to-band tunneling transistors, Journal of Applied Physics, Oct. 2011, pp. 074508, vol. 110, American Institute of Physics.

Tan, Y. et al., Transferable tight-binding model for strained group IV and III-V materials and heterostructures, Physical Review B, Jul. 2016, pp. 045311, vol. 94, American Physical Society.

Datta, S., Nanoscale device modeling: the Green's function method, Superlattices and Microstructures, 2000, pp. 253-278, vol. 28, No. 4, Academic Press.

Jirauschek, C. and Kubis, T., Modeling techniques for quantum cascade lasers, Applied Physics Reviews, Feb. 2014, pp. 011307, Vol. 1, AIP Publishing LLC.

Klimeck, G. et al., Resolution of Resonances in a General Purpose Quantum Device Simulator (NEMO), VLSI Design, Jan. 1998, pp. 107-110, vol. 6, Nos. 1-4, Overseas Publishers Association.

Piprek, J., Efficiency droop in nitride-based light-emitting diodes, Physica Status Solidi A, Jul. 2010, pp. 2217-2225, vol. 207, No. 10, Wiley-VCH Verlag GmbH & Co. KGaA.

Wacker, A., Semiconductor Superlattices: a model system for non-linear transport, Physics Reports, 2002, pp. 1-111, vol. 357, Elsevier Science BV.

Lake, R. et al., Single and multiband modeling of quantum electron transport through layered semiconductor devices, Journal of Applied Physics, Jun. 1997, pp. 7845-7869, vol. 81, No. 12, American Institute of Physics.

Yang, T. J. et al., The influence of random indium alloy fluctuations in indium gallium nitride quantum wells on the device behavior, Journal of Applied Physics, Sep. 2014, pp. 113104, vol. 116, American Institute of Physics.

Fonseca, J. E. et al., Efficient and realistic device modeling from atomic detail to the nanoscale, Journal Comput. Electron., Oct. 2013, pp. 592-600, vol. 12, Springer Science+Business Media, New York.

Lee, S.-C. and Wacker, A., Nonequilibrium Green's function theory for transport and gain properties of quantum cascade structures, Physical Review B, 200, pp. 245314, vol. 66, American Physical Society.

Vukmirovic, N. et al., Quantum transport in semiconductor quantum dot superlattices: Electron-phonon resonances and polaron effects, Physical Review B, 2007, pp. 245313, vol. 76, American Physical Society.

Schmielau, T. and Pereira, M. F., Impact of momentum dependent matrix elements on scattering effects in quantum cascade lassers, Physica Status Solidi (b), 2009, pp. 329-331, vol. 246, No. 2, Wiley-VCH Verlag GmbH & Co. KGaA.

Zheng, X. et al., Nonequilibrium Green's function analysis of interwell transport and scattering in monopolar lasers, Physical Review B, 2006, pp. 245304, vol. 73, The American Physical Society.

(56) References Cited

OTHER PUBLICATIONS

Havu, P. et al., Electron Transport Through Quantum Wires and Point Contacts, Physical Review B, 2004, pp. 233308, vol. 70, The American Physical Society.

Lazzeri, M. et al., Electron Transport and Hot Phonons in Carbon Nanotubes, Physical Review Letters, Dec. 2005, pp. 236802, vol. 95, The American Physical Society.

Lee, S.-C. et al., Quantum mechanical wavepacket transport in quantum cascade laser structures, Physical Review B, 2006, pp. 245320, vol. 73, The American Physical Society.

Thygesen, K. S. and Rubio, A., Conserving GW scheme for nonequilibrium quantum transport in molecular contacts, Physical Review B, 2008, pp. 115333, vol. 77, The American Physical Society.

Svizhenko, A. et al., Two-Dimensional quantum mechanical modeling of nanotransistors, Journal of Applied Physics, Feb. 2002, pp. 2343-2354, vol. 91, No. 4, American Institute of Physics.

Laux, S. E. et al., Analysis of quantum ballistic electron transport in ultrasmall silicon devices including space-charge and geometric effects, Journal of Applied Physics, May 2004, pp. 5545-5582, vol. 95, No. 10, American Institute of Physics.

Frensley, W. R., Boundary conditions for open quantum systems driven far from equilibrium, Reviews of Modern Physics, Jul. 1990, pp. 745-791, vol. 62, No. 3, The American Physical Society.

Pötz, W., Self-consistent model of transport in quantum well tunneling structures, Journal of Applied Physics, Sep. 1989, pp. 2458-2466, vol. 66, No. 6, American Institute of Physics.

Venugopal, R. et al., A simple quantum mechanical treatment of scattering in nanoscale transistors, Journal of Applied Physics, May 2003, pp. 5613-5625, vol. 93, No. 9, American Institute of Physics.

Yanik, A. A. et al., Quantum transport with spin dephasing: A nonequlibrium Green's function approach, Physical Review B, 2007, pp. 045213, vol. 76, The American Physical Society.

Wacker, A. and Jauho, A.-P., Quantum Transport: The Link between Standard Approaches in Superlattices, Physical Review Letters, Jan. 1998, pp. 369-372, vol. 80, No. 2, The American Physical Society.

Matyas, A. et al., Comparison between semi-classical and full quantum transport analysis of THz quantum cascade lasers, Physica E, Dec. 2009, pp. 2628-2631, vol. 42, Issue 10, Elsevier B.V.

Benz, A. et al., Influence of doping on the performance of terahertz quantum-cascade lasers, Applied Physics Letters, 2007, pp. 101107, vol. 90, American Institute of Physics.

\* cited by examiner

300

310
Receive structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions.

320
Identify local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region.

330
Calculate a Hamiltonian of the light emitting diode, the Hamiltonian of the light emitting diode being a sum of (i) a Hamiltonian of the n-doped lead region, (ii) a Hamiltonian of each of the plurality of quantum barrier regions of the multi-quantum-well region, (iii) a Hamiltonian of each of the plurality of quantum well regions of the multi-quantum-well region, and (iv) a Hamiltonian of the p-doped lead region.

340
Calculate a non-equilibrium Green's function by recursively inverting a retarded Green's function having the Hamiltonian of the light emitting diode and calculating a lesser Green's function, the lesser Green's function being calculated differently for local equilibrium regions compared to the non-equilibrium regions.

350
Calculate at least one of carrier densities and current densities at positions within the multi-quantum-well region using the non-equilibrium Green's function.

FIG. 3

METHOD AND SYSTEM FOR REALISTIC AND EFFICIENT SIMULATION OF LIGHT EMITTING DIODES HAVING MULTI-QUANTUM-WELLS

This application claims the benefit of priority of U.S. provisional application Ser. No. 62/509,318, filed on May 22, 2017 the disclosure of which is herein incorporated by reference in its entirety.

FIELD

The device and method disclosed in this document relates to light emitting diodes and, more particularly, to determining carrier transport characteristics of light emitting diodes having a multi-quantum-well structure.

BACKGROUND

Unless otherwise indicated herein, the materials described in this section are not prior art to the claims in this application and are not admitted to the prior art by inclusion in this section.

Multi-quantum-well (MQW) structures are a core technology of many mid-to-high power light emitting diodes (LED). On prominent example is GaN/InGaN blue LEDs. The device performance relies heavily on the emission efficiency at high drive current. Several key challenges exist in nitride-based MQW LEDs design, such as efficiency droop and non-uniform light emission. Typical MQW diodes guide electrons and holes from opposite device ends through a complex heterostructure into confined quantum states which serve as radiative recombination centers. The MQWs are coupled such that tunneling and thermionic transport as well as carrier capture into the quantum wells (QWs) need to be well understood. Carrier transport defined in a quantum system is therefore at the heart of the LED operation.

State-of-the-art modeling approaches of carrier transport in LEDs are typically based on semi-classical physics, which either miss or heuristically patch in quantum effects. Lack of quantitative carrier transport modeling is often visible in the numerical prediction of unrealistic turn-on voltages. The non-equilibrium Green's function (NEGF) formalism is the accepted state-of-the-art carrier transport theory for a wide range of nanoscale semiconductor devices. NEGF provides a physically consistent way to treat tunneling, thermionic emission, scattering and recombination, all on the same footing. NEGF has, however, not been extensively employed for the modeling of optoelectronic devices, due to a variety of issues. NEGF tends to be computationally very expensive, especially for realistically extended complex devices that include incoherent scattering or require full 2D or 3D modeling. There is no accepted NEGF physics-based self-energy that leads to full thermalization in high carrier density device regions. Due to the aforementioned challenges, applications of NEGF to modeling nanoscale semiconductor devices are generally limited in terms of device scale (simplified device structure, band structure) and applicability.

What is needed is a numerically efficient, multi-scale multi-physics NEGF model for modeling a fully extended LED device and quantitatively reproducing its experimental I-V characteristics.

SUMMARY

The design and optimization of realistically extended multi-quantum-well GaN-based light emitting diodes requires a quantitative understanding of the quantum mechanics-dominated carrier flow. Typical devices can be characterized by spatial regions of extremely high carrier densities such as n-GaN/p-GaN layers and quantum wells coupled to each other by tunneling and thermionic emission-based quantum transport. The disclosure develops a multi-scale model that partitions the device into different spatial regions where the high carrier domains are treated as reservoirs in local equilibrium and serve as injectors and receptors of carriers into the neighboring reservoirs through tunneling and thermionic emission. The nonequilibrium Green's function (NEGF) formalism is used to compute the dynamics (states) and the kinetics (filling of states) in the entire extended complex device. The local density of states in the whole device is computed quantum mechanically within a multi-band tight binding Hamiltonian. The model results agree with experimental I-V curves quantitatively.

A method of determining carrier transport characteristics of a light emitting diode is disclosed. The method comprises: receiving, with at least one processor, structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions; identifying, with the at least one processor, local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region; calculating, with the at least one processor, a Hamiltonian of the light emitting diode, the Hamiltonian of the light emitting diode being a sum of (i) a Hamiltonian of the n-doped lead region, (ii) a Hamiltonian of each of the plurality of quantum barrier regions of the multi-quantum-well region, (iii) a Hamiltonian of each of the plurality of quantum well regions of the multi-quantum-well region, and (iv) a Hamiltonian of the p-doped lead region; calculating, with the at least one processor, a non-equilibrium Green's function by recursively inverting a retarded Green's function having the Hamiltonian of the light emitting diode and calculating a lesser Green's function, the lesser Green's function being calculated differently for local equilibrium regions compared to the non-equilibrium regions; and calculating, with the at least one processor, at least one of carrier densities and current densities at positions within the multi-quantum-well region using the non-equilibrium Green's function.

A non-transitory computer readable medium for determining carrier transport characteristics of a light emitting diode is disclosed. The computer readable medium stores a plurality of instructions which are configured to, when executed, cause at least one processor to: receive structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions; identify local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region; calculate a Hamiltonian of the light emitting diode, the Hamiltonian of the light emitting diode being a sum of (i) a Hamiltonian of the n-doped lead region, (ii) a Hamiltonian of each of the plurality of quantum barrier regions of the multi-quantum-well region, (iii) a Hamiltonian of each of the plurality of quantum well regions of the multi-quantum-well region, and (iv) a Hamiltonian of the p-doped lead region; calculate a non-equilibrium Green's function by recursively inverting a retarded Green's function having the Hamiltonian of the light emitting diode and calculating a lesser Green's function, the lesser Green's function being calculated differently for local equilibrium regions compared to the non-equilibrium regions; and calculate at least one of carrier densities and current densities at positions within the multi-quantum-well region using the non-equilibrium Green's function.

An apparatus for determining carrier transport characteristics of a light emitting diode is disclosed. The apparatus comprises: a data storage device configured to store (i) structural and material parameters of the light emitting diode and (ii) a plurality of instructions; and at least one processor operably connected to the data storage device. The at least one processor is configured to execute the plurality of instructions on the data storage device to: receive structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions; identify local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region; calculate a Hamiltonian of the light emitting diode, the Hamiltonian of the light emitting diode being a sum of (i) a Hamiltonian of the n-doped lead region, (ii) a Hamiltonian of each of the plurality of quantum barrier regions of the multi-quantum-well region, (iii) a Hamiltonian of each of the plurality of quantum well regions of the multi-quantum-well region, and (iv) a Hamiltonian of the p-doped lead region; calculate a non-equilibrium Green's function by recursively inverting a retarded Green's function having the Hamiltonian of the light emitting diode and calculating a lesser Green's function, the lesser Green's function being calculated differently for local equilibrium regions compared to the non-equilibrium regions; and calculate at least one of carrier densities and current densities at positions within the multi-quantum-well region using the non-equilibrium Green's function.

BRIEF DESCRIPTION OF THE DRAWINGS

The foregoing aspects and other features of the method and system are explained in the following description, taken in connection with the accompanying drawings.

FIG. 3 shows a method for computing carrier transport characteristics or other physical phenomena within a light emitting diode.

DETAILED DESCRIPTION

Figure 1:
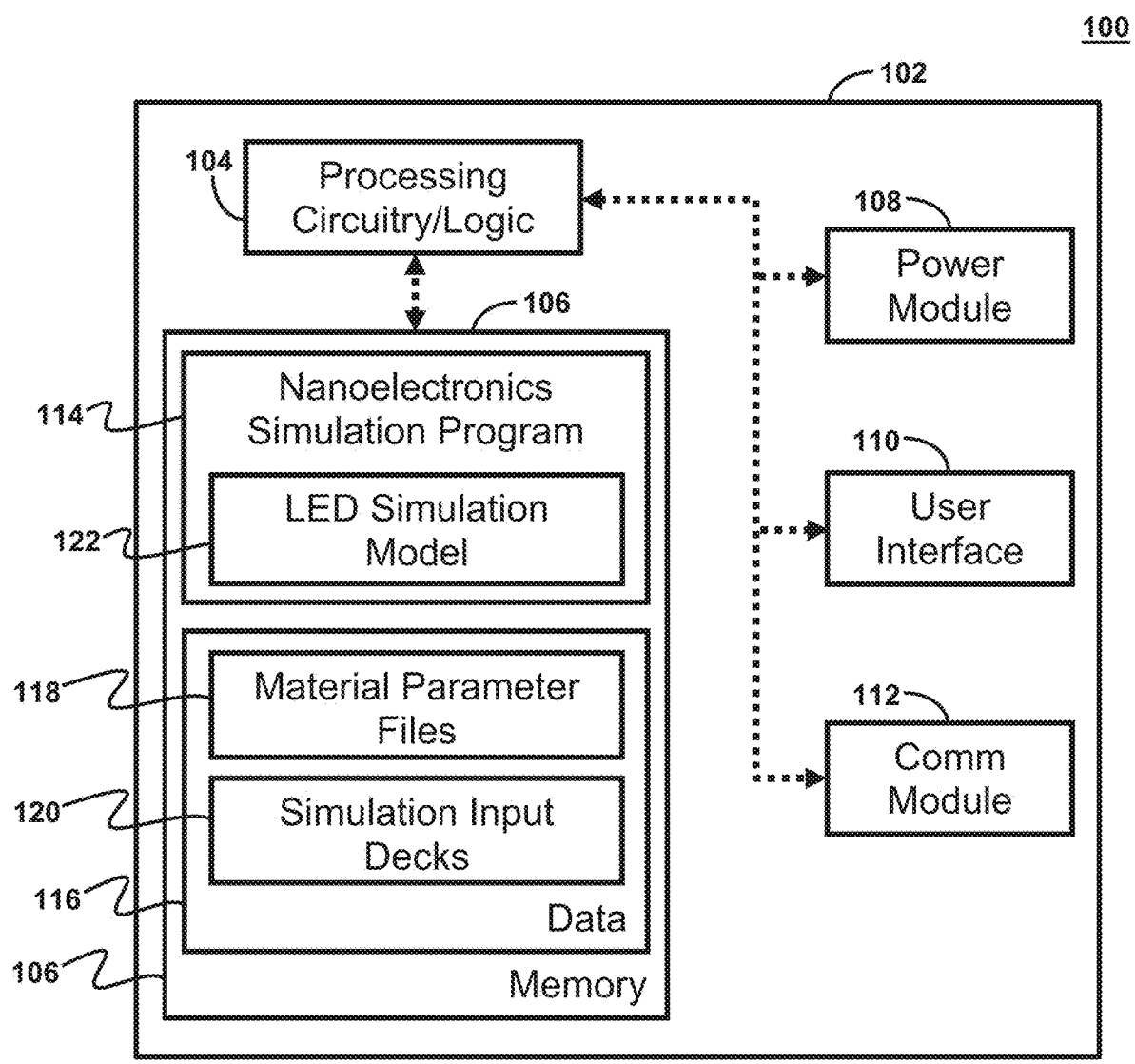
FIG. 1 shows a block diagram of an exemplary embodiment of a nanoelectronics simulation system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Nanoelectronics Simulation System

FIG. 1 shows a block diagram of an exemplary embodiment of a nanoelectronics simulation system 100. The nanoelectronics simulation system 100 is typically provided in a housing, cabinet, or the like 102 that is configured in a typical manner for a computing device. In one embodiment, the nanoelectronics simulation system 100 includes processing circuitry/logic 104, memory 106, a power module 108, a user interface 110, and a network communications module 112. It is appreciated that the illustrated embodiment of the nanoelectronics simulation system 100 is only one exemplary embodiment of a nanoelectronics simulation system 100 and is merely representative of any of various manners or configurations of a simulation system, personal computer, server, or any other data processing systems that are operative in the manner set forth herein.

The processing circuitry/logic 104 is configured to execute instructions to operate the nanoelectronics simulation system 100 to enable the features, functionality, characteristics and/or the like as described herein. To this end, the processing circuitry/logic 104 is operably connected to the memory 106, the power module 108, the user interface 110, and the network communications module 112. The processing circuitry/logic 104 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processing circuitry/logic 104 may include a system with a central processing unit, multiple processing units, or dedicated circuitry for achieving specific functionality.

The memory 106 may be of any type of device capable of storing information accessible by the processing circuitry/ logic 104, such as a memory card, ROM, RAM, write-capable memories, read-only memories, hard drives, discs, flash memory, or any of various other computer-readable medium serving as data storage devices as will be recognized by those of ordinary skill in the art. The memory 106 is configured to store instructions including a nanoelectronics simulation program 114 for execution by the processing circuitry/logic 104, as well as data 116 for use by the nanoelectronics simulation program 114.

With continued reference to FIG. 1, the power module 108 of the nanoelectronics simulation system 100 is configured to supply appropriate electricity to the nanoelectronics simulation system 100 (i.e., including the various components of the nanoelectronics simulation system 100). The power module 108 may operate on standard 120 volt AC electricity, but may alternatively operate on other AC voltages or include DC power supplied by a battery or batteries.

The network communication module 112 of the nanoelectronics simulation system 100 provides an interface that allows for communication with any of various devices using various means. In particular, the network communications module 112 may include a local area network port that allows for communication with any of various local computers housed in the same or nearby facility. In some embodiments, the network communications module 112 further includes a wide area network port that allows for communications with remote computers over the Internet. Alternatively, the nanoelectronics simulation system 100 communicates with the Internet via a separate modem and/or router of the local area network. In one embodiment, the network communications module is equipped with a Wi-Fi transceiver or other wireless communications device. Accordingly, it will be appreciated that communications with the nanoelectronics simulation system 100 may occur via wired communications or via the wireless communications. Communications may be accomplished using any of various known communications protocols.

The nanoelectronics simulation system 100 may be operated locally or remotely by a user. To facilitate local operation, the nanoelectronics simulation system 100 may include an interactive user interface 110. Via the user interface 110, a user may access the instructions, including the nanoelectronics simulation program 114, and may collect data from and store data to the memory 106. In at least one embodiment, the user interface 110 may suitably include an LCD display screen or the like, a mouse or other pointing device, a keyboard or other keypad, speakers, and a microphone, as will be recognized by those of ordinary skill in the art. Alternatively, in some embodiments, a user may operate the nanoelectronics simulation system 100 remotely from another computing device which is in communication therewith via the network communication module 112 and has an analogous user interface.

Nanoelectronics Simulation Program

As discussed above, the nanoelectronics simulation system 100 includes a nanoelectronics simulation program 114 stored in the memory 106. The nanoelectronics simulation program 114 is configured to enable to nanoelectronics simulation system 100 to perform calculations of carrier transport characteristics or other physical phenomena within the nanoelectronic device. As will be discussed in further detail below, the nanoelectronics simulation program 114 improves upon conventional simulation methods by enabling multi-scale simulations that reflect an accurate and quantitative understanding of quantum mechanics-dominated carrier flow in an entire realistically extended complex device. To accomplish this, the nanoelectronics simulation program 114 partitions the complex device into different spatial regions and the high carrier regions are treated as reservoirs in local equilibrium, which serve as injectors and receptors of carriers into the neighboring reservoirs through tunneling and thermionic emission. The nonequilibrium Green's function (NEGF) formalism is used to compute the dynamics (states) and the kinetics (filling of states) in the entire extended complex device. The local density of states in the whole device, as well as other physical quantities, are accurately computed quantum mechanically within a multi-band tight binding Hamiltonian.

In one exemplary embodiment, the data 116 includes material parameter files 118 and simulation input decks 120. The material parameter files 118 and simulation input decks 120 include data which defines the structure of the nanoelectronic device to be simulated, as well as various parameters of the simulation to be performed. The material parameter files 118 and/or simulation input decks 120 describe the structure of the nanoelectronic device at an atomic level, and may include information such as geometries, types of materials, doping levels, crystal structures, and other physical characteristics. Additionally, the material parameter files 118 and/or simulation input decks 120 may describe simulation parameters such as bias voltages, input currents, ambient conditions, physical constants, values for experimentally determined parameters, simulation settings, etc. In some embodiments, the simulation input decks 120 are written in a suitable input deck programming language.

The nanoelectronics simulation program 114 receives the material parameter files 118 and simulation input decks 120 as inputs and utilizes one or more models, algorithms, and/or processes to calculate carrier transport characteristics, or other physical phenomena, of the device defined by the respective material parameter files 118 and simulation input decks 120. In at least one embodiment, the nanoelectronics simulation program 114 is configured to provide the calculated carrier transport characteristics or other physical phenomena in the form of an output file which can be used by another program. In some embodiments, the nanoelectronics simulation program 114 is configured to operate a display device of the user interface 110 to display a graphical depiction of the calculated carrier transport characteristics or other physical phenomena, such as a graph, plot, diagram, or the like.

Light Emitting Diode Simulation Model

With continued reference to FIG. 1, the nanoelectronics simulation program 114 includes a light emitting diode (LED) simulation model 122 configured to simulate carrier transport characteristics or other physical phenomena within a light emitting diode having a multi-quantum-well. As used herein, the phrase "light emitting diode" refers to the structure of a light emitting diode and is not limited to uses of light emitting diodes to emit light. As such, the phrase "light emitting diode" may include the structure of a light emitting diode used to detect or receive light. Various methods for simulating carrier transport characteristics or other physical phenomena within a light emitting diode having a multi-quantum-well are described below. In the description of the methods, statements that the method or model is performing some task or function refers to a general purpose processor, controller, or the like executing programmed instructions stored in non-transitory computer readable storage media operatively connected to the processor to manipulate data or to operate one or more components in the nanoelectronics simulation system 100 to perform the task or function. Particularly, the processing circuitry/logic 104 above may be such a processor and the executed program instructions may be stored in the memory 106. Additionally, the steps of the methods may be performed in any feasible chronological order, regardless of the order shown in the figures or the order in which the steps are described.

Figure 2:
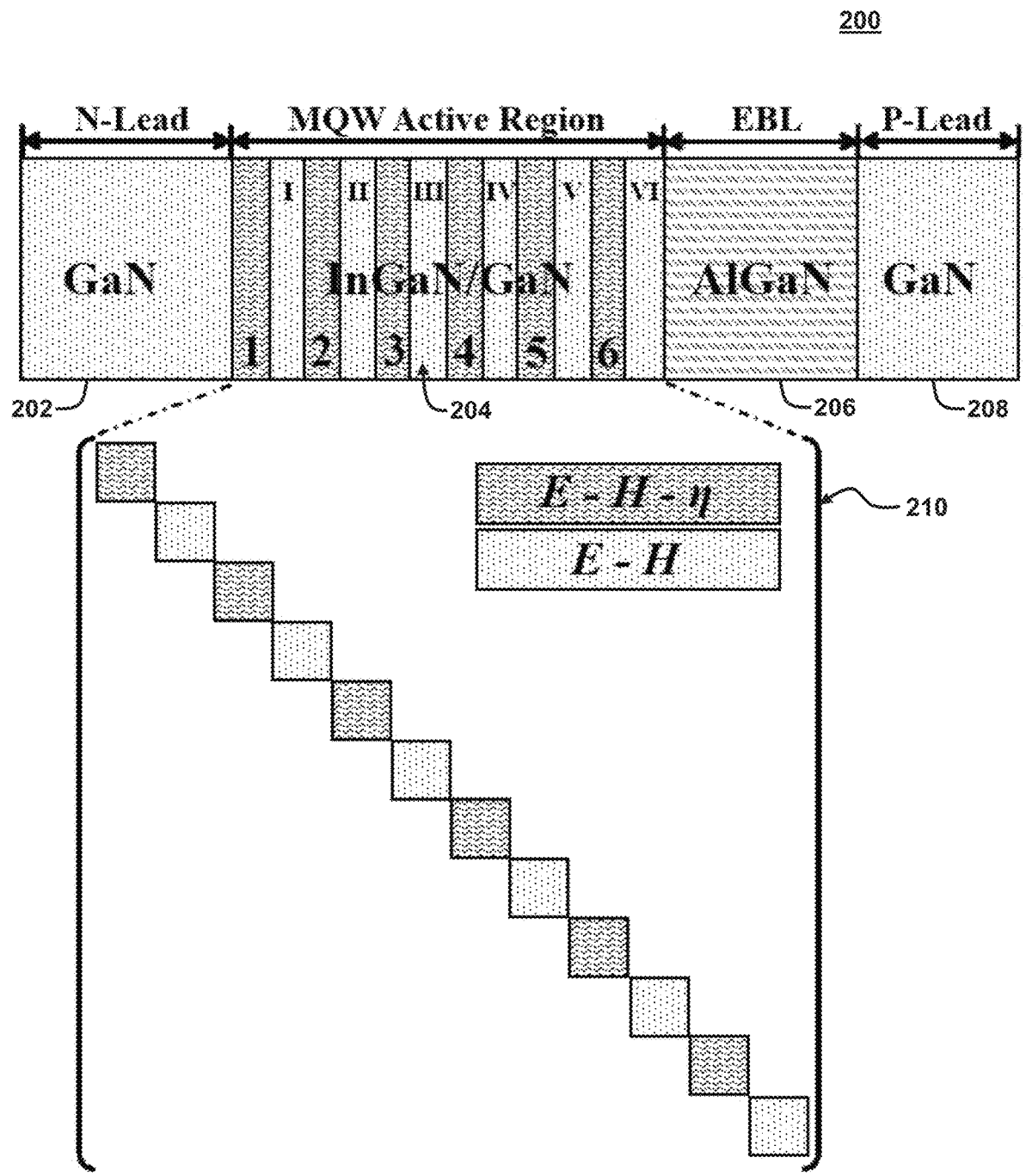
FIG. 2 shows an exemplary embodiment of a light emitting diode having a multi-quantum-well.

FIG. 2 shows an exemplary structure of a light emitting diode 200, which is accurately modeled by the light emitting diode simulation model 122. The light emitting diode 200 comprises an n-doped lead region 202, a multi-quantum-well (MQW) region 204, an electron-blocking layer (EBL) region 206, and a p-doped lead region 208. The electron-blocking layer region is arranged between the multi-quantum-well region 204 and the p-doped lead region 208. The multi-quantum-well region is arranged between the n-doped lead region 202 and the electron-blocking layer region 206. In some cases, the electron-blocking layer region 206 and the p-doped lead region 208 may be collectively referred to herein as the "p-lead." The multi-quantum-well region 204 can be considered the active region of the light emitting diode 200 and has a plurality of quantum barrier regions interleaved with a plurality of quantum well regions. In the embodiment shown, multi-quantum-well region 204 includes six quantum barrier regions I-VI interleaved with six quantum well regions 1-6. In the embodiment shown, the light emitting diode 200 is based on homogeneous wurtzite GaN/InGaN layer structures grown along the c-axis. Particularly, the n-doped lead region 202 is comprised of n-doped GaN, the quantum barrier regions I-VI are comprised of GaN, the quantum well regions 1-6 are comprised of InGaN, the electron-blocking layer region 206 is comprised of AlGaN, and the pn-doped lead region 208 is comprised of p-doped GaN. The GaN layers confine electrons and holes to allow for radiative recombination in the quantum wells. We note that the light emitting diode 200 may similarly comprise any other suitable materials.

As discussed below, light emitting diode 200 can be partitioned into regions with pronounced carrier scattering (i.e. InGaN quantum well regions 1-6) and regions of coherent carrier tunneling (i.e. GaN quantum barrier regions I-VI). Due to the high carrier density in LED quantum wells, the thermalizing scattering is very pronounced in each of the quantum well regions I-VI. Since the quantum well regions 1-6 are well separated from each other by the large tunneling quantum barrier regions I-VI, each of the quantum well regions 1-6 is considered as a carrier reservoir at local equilibrium with its unique local Fermi level. When a bias voltage is applied on the total structure, each local equilibrium region has different, self-consistently determined Fermi levels (as discussed below). Consequently, the quantum mechanically confined states of each reservoir inject/receive states to/from the adjacent reservoirs via quantum mechanical tunneling and thermionic emission.

FIG. 3 shows a method 300 for computing carrier transport characteristics or other physical phenomena within a light emitting diode. The method 300 advantageously partitions the light emitting diode 200 into regions of pronounced carrier scattering and regions of coherent carrier tunneling. In this way, the method 300 improves the functioning of the nanoelectronics simulation system 100 by enabling the processor circuitry/logic 104 to treat certain portions of the light emitting diode 200 as reservoirs in local equilibrium which serve as injectors and receptors of carriers into the neighboring reservoirs through tunneling and thermionic emission. The partitioning of the light emitting diode 200 also enables the nonequilibrium Green's function (NEGF) formalism to be utilized in more numerically efficient manner to compute carrier transport characteristics or other physical phenomena within the light emitting diode 200.

The method 300 begins with a step of receiving structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions (block 310). Particularly, with respect to the embodiments disclosed in detail herein, the processor circuitry/logic 104 of the nanoelectronics simulation system 100 is configured to receive structural and material parameters (e.g., the material parameter files 118 and simulation input decks 120 discussed above). In some embodiments, the processor circuitry/logic 104 is configured to read the structural and material parameters from the memory 106. However, in other embodiments, the processor circuitry/logic 104 is configured to receive the structural and material parameters from an external source via the network communications module 112. The received structural and material parameters at least include data which define the structure of the light emitting diode to be simulated. In the example of FIG. 2, the received structural and material parameters would define the n-doped lead region 202, the multi-quantum-well (MQW) region 204 having the quantum barrier regions I-VI interleaved with the quantum well regions 1-6, the electron-blocking layer (EBL) region 206, and the p-doped lead region 208. In some embodiments, the received structural and material parameters describe the structure of the nanoelectronic device at an atomic level, and may include information such as geometries, types of materials, doping levels, crystal structures, and other physical characteristics. In some embodiments, the received structural and material parameters describe simulation parameters such as bias voltages, input currents, ambient conditions, physical constants, values for experimentally determined parameters, simulation settings, etc.

The method 300 continues with steps of identifying local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region (block 320). Particularly, the processor circuitry/logic 104 is configured to partition the light emitting diode into its respective regions (e.g., the n-doped lead region 202, the multi-quantum-well region 204 having the quantum barrier regions I-VI interleaved with the quantum well regions 1-6, the electron-blocking layer region 206, and the p-doped lead region 208). The processor circuitry/logic 104 is configured to identify each of the regions as being an equilibrium region or a non-equilibrium region. Particularly, in one embodiment, the quantum well regions 1-6, as well as the n-doped lead region 202 and the p-doped lead region 208, are identified and treated as carrier reservoirs having a local equilibrium. In contrast, in one embodiment, the quantum barrier regions I-VI are identified and treated as non-equilibrium coherent transport regions. In one embodiment, the electron-blocking layer region 206 is identified and treated as a non-equilibrium coherent transport region for the purpose of electron transport, but identified and treated as a carrier reservoir having a local equilibrium for the purpose of hole transport. The equilibrium regions serve as injectors and receptors of carriers into the neighboring reservoirs through quantum mechanical tunneling and thermionic emission.

The method 300 continues with a step of calculating a Hamiltonian of the light emitting diode as a sum of (i) the Hamiltonian of the n-doped lead region, (ii) the Hamiltonian of each of the plurality of quantum barrier regions of the multi-quantum-well region, (iii) the Hamiltonian of each of the plurality of quantum well regions of the multi-quantum-well region, (iv) the Hamiltonian of the electron-blocking layer region, and (v) the Hamiltonian of the p-doped lead region (block 330). Particularly, the processor circuitry/logic 104 is configured to calculate a Hamiltonian of each of the partitioned regions of the lighting emitting diode 200. The processor circuitry/logic 104 is configured to form a Hamiltonian of the entire lighting emitting diode 200 as a sum of the individual Hamiltonians of the partitioned regions. More particularly, the Hamiltonian $H_{Device}$ of the entire lighting emitting diode 200 is defined by equation 1:

$$H_{Device} = H_{LL} + H_{W1} + H_{BI} + H_{W2} + H_{BII} + H_{W3} + H_{BIII} + H_{W4} + H_{BIV} + H_{W5} + H_{BV} + H_{W6} + H_{BVI} + H_{RL} \quad (1).$$

Here, $H_{LL}$ refers to the Hamiltonian of the n-GaN lead region 202 and $H_{RL}$ refers to the Hamiltonian of the combined AlGaN electron-blocking layer region 206 and p-GaN lead region 208. Additionally, $H_{BI}$, $H_{BII}$, $H_{BIII}$, $H_{BIV}$, $H_{BV}$, and $H_{BVI}$ refer to the Hamiltonians of the quantum barrier regions I-VI, respectively. Similarly, $H_{W1}$, $H_{W2}$, $H_{W3}$, $H_{W4}$, $H_{W5}$, and $H_{W6}$ refer to the Hamiltonians of the quantum well regions 1-6, respectively. In one embodiment, the Hamiltonian of electrons and holes is considered in atomistic tight binding representation with 20 orbitals per atom ($sp^3d^5s^*$ representation including spin-orbit interaction) with interorbital coupling limited to nearest neighbors. In one embodiment, the parameters of InN and GaN are each fitted against bulk DFT calculations using VASP with the HSE06 potentials. In one embodiment, in-plane periodicity of the Hamiltonian matrices is incorporated with the Bloch theorem.

In one embodiment, in each reservoir, an imaginary optical potential $\eta$ is included in the diagonal of the Hamiltonian (as shown in FIG. 2). This $\eta$ mimics the effect of scattering by broadening the quantum well states. Therefore, in one embodiment, the value of $\eta$ is chosen to match the experimental photoluminescent (PL) emission widths of 100 meV. In another embodiment, for comparison and when indicated explicitly, an artificially small broadening of 10 meV is assumed as well. In one embodiment, the optical potential $\eta$ is assumed to be constant above the material's band edge in each quantum well and decays exponentially into the bandgap with a decay length of 50 meV. This exponential decay properly accounts for transport through the band tail states. However, it will be appreciated that the optical potential $\eta$ may have different shapes.

With continued reference to FIG. 3, the method 300 continues with a step of calculating a non-equilibrium Green's function by recursively inverting a retarded Green's function having the Hamiltonian of the light emitting diode and calculating a lesser Green's function, the lesser Green's function being calculated differently for local equilibrium regions compared to the non-equilibrium regions (block 340). Particularly, the processor circuitry/logic 104 is configured to calculate at least one non-equilibrium Greens function (NEGF) for the light emitting diode using the Hamiltonian of the light emitting diode. Particularly, electron and hole transport characteristics are solved with the NEGF formalism. The NEGF Green's functions and self-energies are matrices with respect to the tight binding orbital parameter and atomic layer index and depend on the energy and in-plane momentum as parameters. The energy and momentum meshes for the quantum transport simulation are obtained with an adaptive-refinement method that optimizes around the peaks of charge density and current in each region. Particularly, the retarded Green's function of the device is solved by recursively inverting equation 2:

$$G_{Device}^R = [E - H_{Device} - \Sigma_S^R - \Sigma_D^R - \eta]^{-1} \quad (2),$$

where E is an input parameter representing the respective particle energy, $\Sigma_S^R$ and is $\Sigma_D^R$ are the retarded contact self-energies (representing areas left of the region 202 and right of the region 208 in FIG. 2). Equation 2 is solved for many energies E until convergence is achieved.

FIG. 2 shows a schematic drawing 210 of the inverse of $G_{Device}^R$ in matrix form in the active region. The scattering $\eta$ is only included in the quantum well regions 1-6, where a thermal equilibrium assumption is applied. The poles of the retarded Green's function yield the energy and width of the electronic scattering states of the system.

Following the partitioning of the light emitting diode 200, discussed above, the lesser Green's function is solved individually for each region, for example in a piece-wise manner. In equilibrium regions i, the lesser Green's function is solved with the local Fermi level $\mu_i$ according to equation 3:

$$G_{i,eq.}^< = -f(\mu_i)(G_i^R - G_i^{R\dagger}) \quad (3),$$

where $G_i^R$ is the submatrix of $G_{device}^R$ in the region i, $G_i^{R\dagger}$ is the Hermitian conjugate of $G_i^R$, and f denotes the Fermi distribution function.

In contrast, for non-equilibrium regions j, the lesser Green's function is solved according to equation 4:

$$G_{j,noneq.}^< = G_j^R \Sigma_j^< G_j^{R\dagger} \quad (4),$$

where $G_j^R$ is the submatrix of $G_{Device}^R$ in the region j, $G_j^{R\dagger}$ is the Hermitian conjugate of $G_j^R$, and $\Sigma_j^<$ is the sum of the contact self-energy of region j due to its coupling with the neighboring equilibrium regions j−1 and j+1, according to equation 5:

$$\Sigma_j^< = -f(\mu_{j+1})(\Sigma_{j+1}^R - \Sigma_{j+1}^{R\dagger}) - f(\mu_{j-1})(\Sigma_{j-1}^R - \Sigma_{j-1}^{R\dagger}) \quad (5).$$

The left and right connected self-energies $\Sigma_{j+1}^R$ and $\Sigma_{j-1}^R$ appear in the standard recursive Green's function algorithm and describe the coupling of region j with its neighboring regions. $\Sigma_{j+1}^{R\dagger}$ and $\Sigma_{j-1}^{R\dagger}$ are the Hermitian conjugates of $\Sigma_{j+1}^R$ and $\Sigma_{j-1}^R$. Note that in this way, all quantum wave effects of surrounding regions are included in the solution of the j-th region.

With continued reference to FIG. 3, the method 300 continues with a step of electron densities and hole densities at positions within the multi-quantum-well region using the non-equilibrium Green's function (block 350). Particularly, the processor circuitry/logic 104 is configured to calculate electronic densities and/or hole densities at least at positions within the multi-quantum-well region 204 using the non-equilibrium Green's functions discussed above. Physical quantities including charge density and current are derived from the Green's function following standard NEGF formalism.

Particularly, following standard NEGF formalism, a stationary carrier density n(z) and current density j(z) can be calculated using the lesser Green's functions $G^<$ and the equations 6.1 and 6.2:

$$n(z) \propto \int dE d^2 k \, \mathrm{Im} G^<(z, z, k, E), \quad (6.1)$$

-continued $$j(z) \propto \int dE d^2 k \lim_{z \to z'} \text{Re}\left[\left(\frac{d}{dz} - \frac{d}{dz'}\right) G^<(z, z', k, E)\right], \quad (6.2)$$

where z and z' are coordinates along the transport direction (left to right in FIG. 2), k is the particle momentum perpendicular to the transport, and E is the particle energy.

Since various quantum well regions are not in equilibrium with each other, and also electron and holes are not in equilibrium, their Fermi levels are different. For each equilibrium region, the electron and hole Fermi levels are set such that total current density, i.e. the sum of inflow, outflow and recombination current density is zero, according to equation 7:

$$J_{j-1}^{e/h} - J_j^{e/h} \mp J_j^R = 0 \quad (7)$$

where $J_j^{e/h}$ is the coherent current density flowing out of quantum well j, and superscript 'e/h' denotes 'electron' or 'hole' current. $J_j^R$ is the total recombination current, which is the sum of Shockley-Read-Hall (SRH), radiative, and Auger components, according to equation 8:

$$J_j^R = J_j^{SRH} + J_j^{RAD} + J_j^{AUG} \quad (8).$$

The recombination current in each quantum well is calculated from its equilibrium density via the well-established empirical 'ABC' equations, for example with parameters $A=1.43\times10^7$ s$^{-1}$, $B=2.9\times10^{-11}$ cm$^3$s$^{-1}$, and $C=1.6\times10^{-30}$ cm$^6$s$^{-1}$ extracted from experimental benchmark data. A total generation current can be similarly calculated in the case that the light emitting diode 200 is operated as a light sensor or light receiver.

The electrostatic potential is calculated self-consistently by solving the Poisson equation with the quantum charge density. The ionized doping concentration is calculated with the incomplete ionization model, using 0.16 eV ionization energy for Mg. Piezoelectric polarization is calculated analytically from strain tensors, with parameters including elastic constants, piezoelectric constants and spontaneous polarization, assuming linear alloy scaling.

FIGS. 4-9 show exemplary results calculated using the LED simulation model 122. In the example, the LED simulation model 122 is applied to simulate a commercial LED structure in which: the emitter lead consists of a 15.5 nm n-type GaN layer doped at $1\times10^{18}$ cm−3 followed by a 20.7 nm n-type GaN layer doped at $4\times10^{18}$ cm$^{-3}$ (corresponding to the n-doped lead region 202); the active region contains 6 repeating In0.13Ga0.87N/GaN quantum wells and barriers, with well thickness of 3.1 nm and barrier thickness of 4.6 nm, unintentionally n-doped at $2\times10^{15}$ cm$^{-3}$ (corresponding to the multi-quantum-well region 204); and the collector lead consists of a 24.8 nm Al0.12Ga0.87N electron-blocking layer (corresponding to the electron-blocking layer region 206) followed by a 15.5 nm GaN layer, with p-type doping of $4\times10^{19}$ cm$^{-3}$ (corresponding to the p-doped lead region 208).

Figure 4:
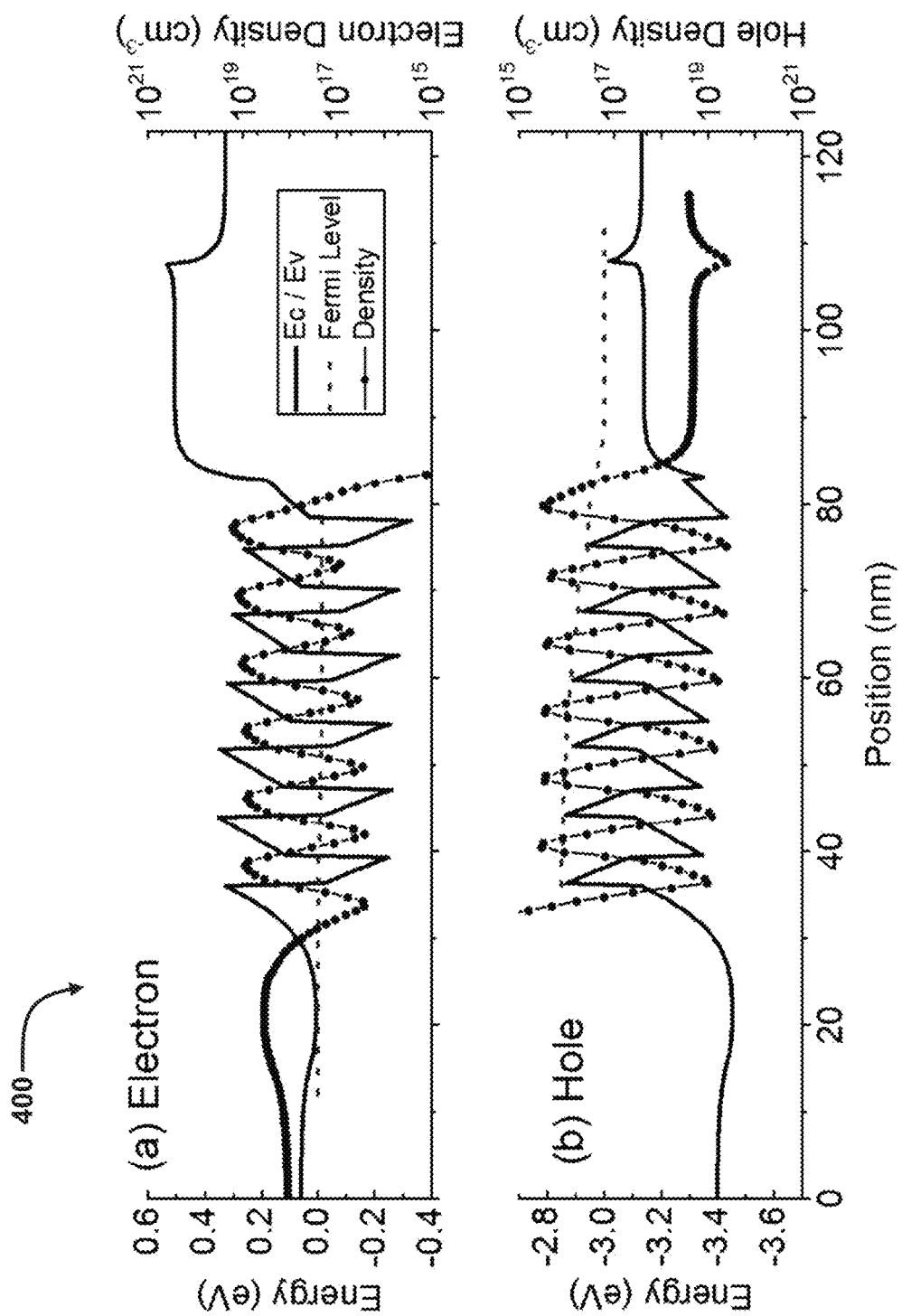
FIG. 4 shows data plots illustrating conduction/valence band profiles along with electron/hole density across the light emitting diode.
Figure 5:
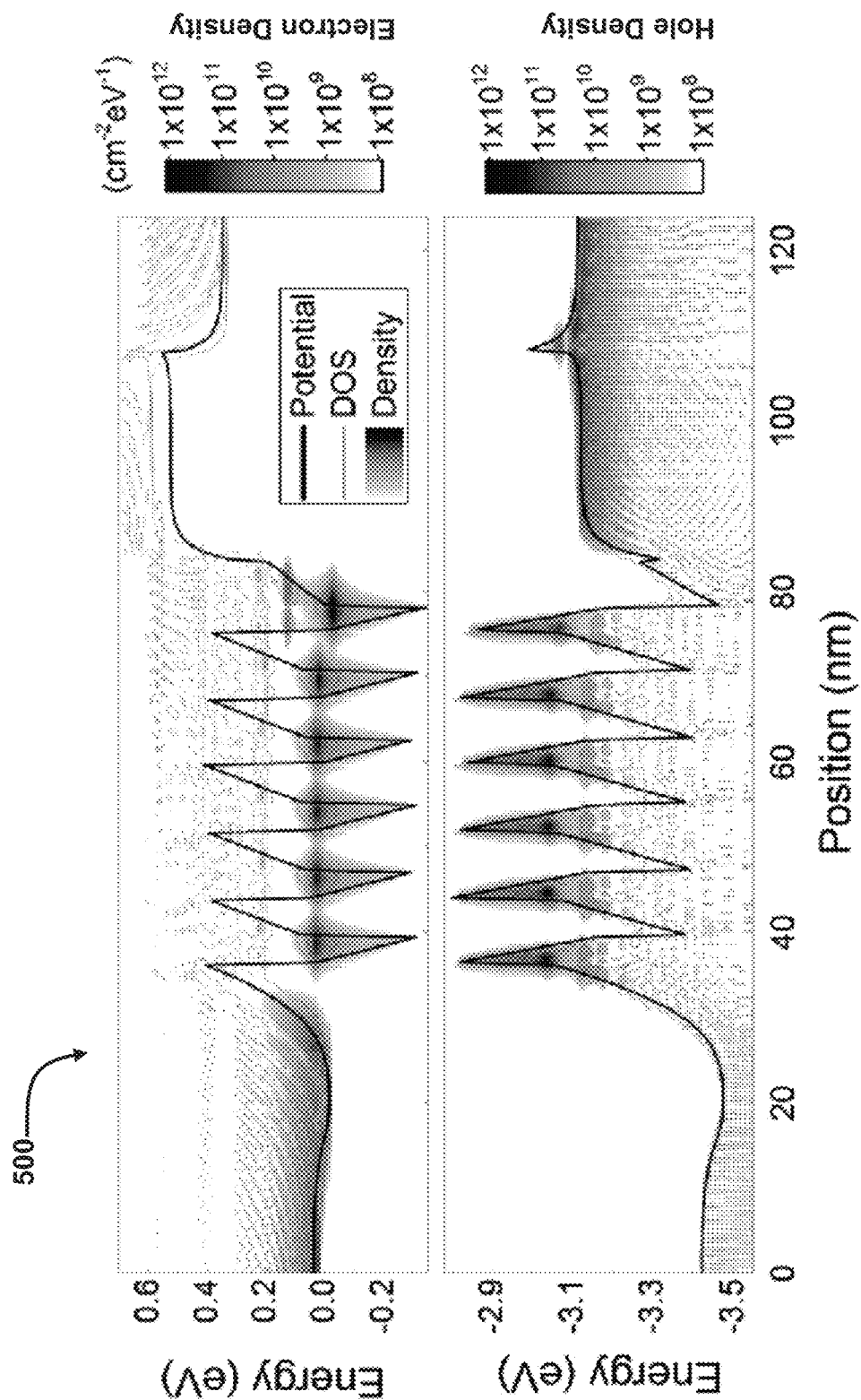
FIG. 5 shows data plots illustrating conduction/valence band potentials, density-of-states (DOS), and electron/hole density.

FIG. 4 shows data plots 400 illustrating conduction/valence band profiles along with electron/hole density across the light emitting diode 200. Also shown are the electron and hole Fermi levels across the light emitting diode 200. As can be seen, the drop of electron Fermi levels from n-GaN lead to the 6th quantum well is only 15 meV, while the drop of hole Fermi levels from p-GaN lead to the 1st quantum well is around 150 meV. Clearly the holes are not well transported across the multi-quantum-well and large Fermi level drops are needed to support required total current conservation. Note that local Fermi levels (dashed lines) are only defined in the leads and quantum wells, where those regions are treated as in thermal equilibrium, the continued lines across barriers are meant to guide the eye. FIG. 5 shows data plots 500, which are similar to the data plots 400, illustrating conduction/valence band potentials, density-of-states (DOS), and electron/hole density.

Figure 6:
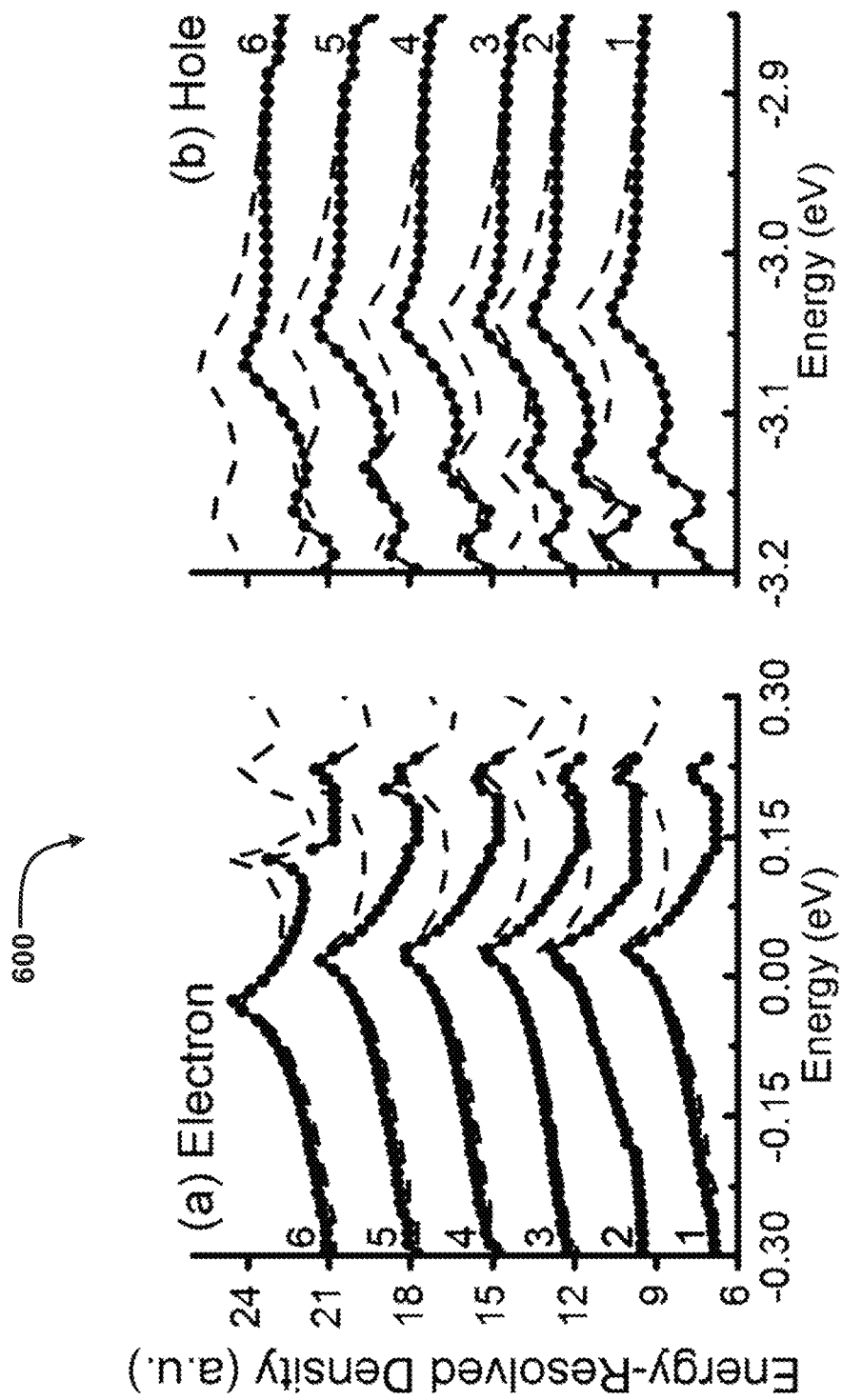
FIG. 6 shows data plots illustrating the energy distributed charge densities and density-of-states for each individual quantum well regions.

FIG. 6 shows data plots 600 illustrating the energy distributed charge densities and density-of-states (DOS) for each individual quantum well regions 1-6. Particularly, energy-resolved electron densities (a) and hole densities (b) are shown as connected dots and corresponding density-of-states are shown as dashed lines. The states in the quantum well regions 1-6 are broadened due to η and coupled to each other, which is a direct manifestation of finite carrier lifetime, due to frequent scattering events and coupling to the open leads. Therefore, carrier transport occurs through a complex, extended structure, and is directly influenced by the overall quantum-mechanical properties of the system. The electrons fill all the quantum well ground states (~30 meV) and partially fill the excited states (~0.2 eV). The hole states are spaced much more closely in energy due to their larger effective mass. The heavy and light hole bands are explicitly coupled in this model due to breaking of translational symmetry. The hole charge density spreads in energy over multiple confined quantum states.

Figure 7:
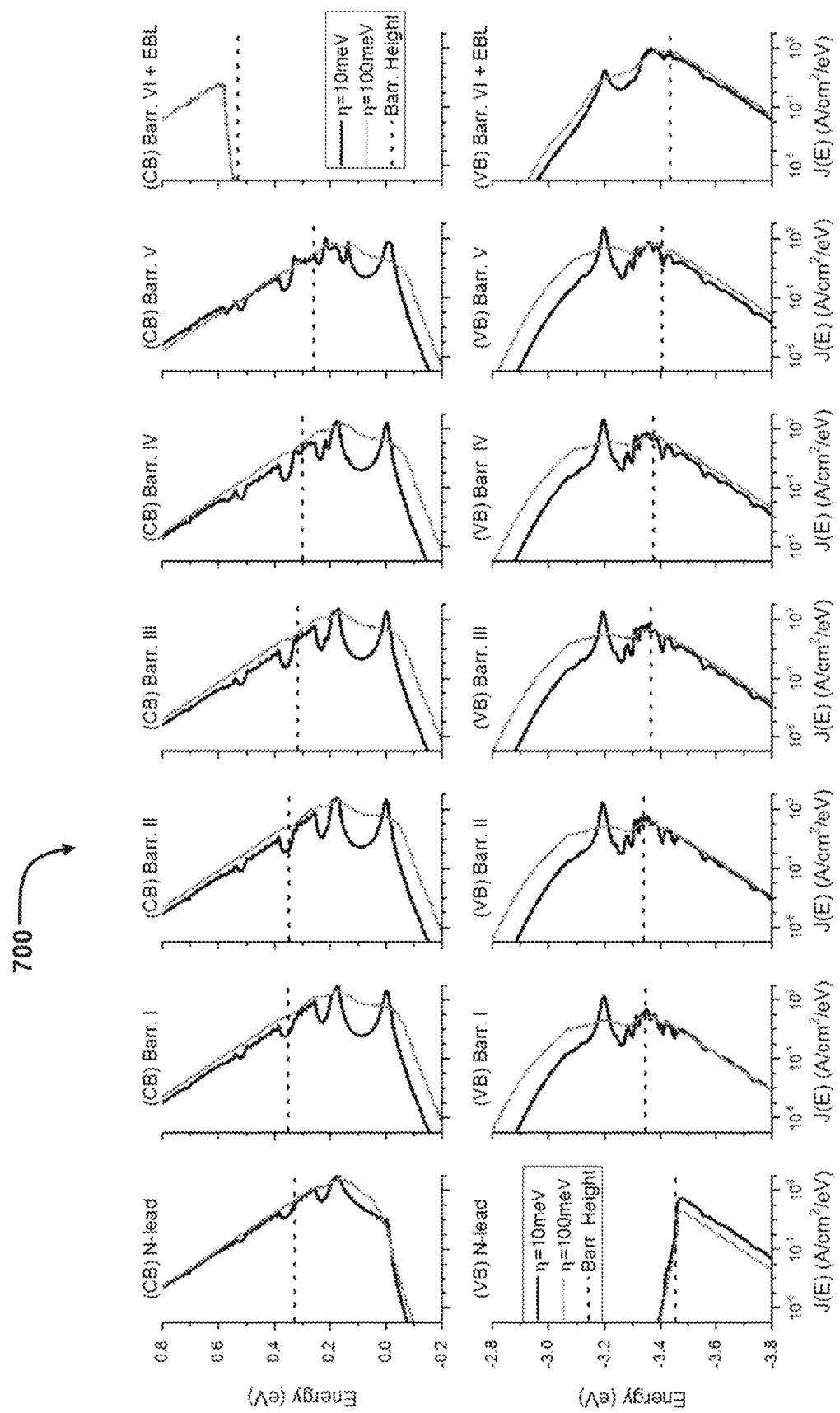
FIG. 7 shows data plots illustrating the energy-resolved current density at zero in-plane momentum across each quantum barrier region.

FIG. 7 shows data plots 700 illustrating the energy-resolved current density at zero in-plane momentum (J(E, $\vec{k}$=0)) across each quantum barrier region I-VI. For comparison, two cases with different scattering rates η=10 and 100 meV) were plotted together. At η=10 meV, corresponding to the lower scattering rate, the current density exhibits distinct (and broadened) resonances, and the current contribution from various confined states can be identified. At η=100 meV, which is a broadening that corresponds to experimental optical linewidth measurements, the various states become cross-coupled and the current density curves become smooth. At η=10, current density peaks are broadened, but various resonance states are still distinctly visible. At η=100 meV, resonance peaks are much broadened and as a result, states are cross-coupled together and the curve became smooth. Additionally, η=100 meV leads to the quantitative agreement with experimental data shown later. What is more noteworthy, however, is that vast majority of current contribution comes from tunneling under the barriers. The barrier height is marked with a dashed line in each figure, and from that one can see, the bulk of current occurs below the barrier both in the conduction band and in the valance band. After current contributions from all in-plane momentum are summed up, almost all the electron current (99%) and the majority of hole current (75%) are contributed through tunneling. Tunneling is naturally included, and treated in the same footing with thermionic emission in our quantum-based tool. This shows clear improvement over conventional semi-classical-based tools in which tunneling, especially for holes, is typically ignored or treated as a patched-in effect.

Figure 8:
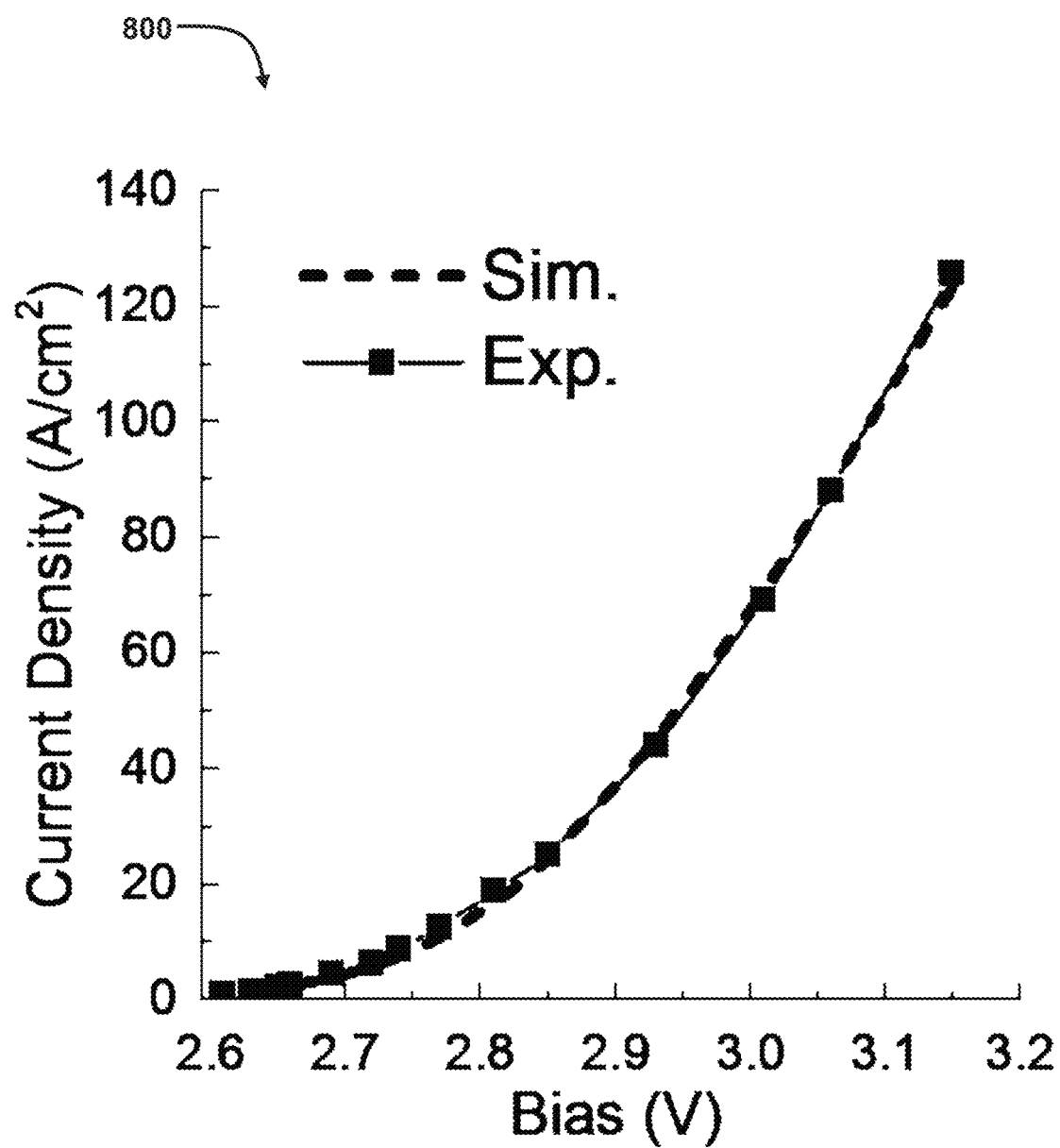
FIG. 8 shows a data plot comparing the simulated I-V characteristics with experimental data.

FIG. 8 shows a data plot 800 comparing the simulated I-V characteristics with experimental data. The experimental structure contains series resistance in the order of a few mΩ·cm2, mainly induced by the contacts and spreading layer. Particularly, the simulations presented in the data plot 800 assumed a fitted series resistance of 2.3 mΩ·cm2, a 400K electron temperature and a 100 meV spectral broadening in the quantum wells. A well-known challenge of conventional semi-classical-based modeling is the difficulty in obtaining a good I-V match with experiment. Typically, a much larger bias voltage is needed to model the same current as measured in experiments. Additionally, conventional semi-classical-based modeling typically predicts an unrealistic turn-on voltage under normal conditions, which is a clear indication of the missing critical transport physics in semi-classical models. Therefore, a key improvement here is that the turn-on voltage of this complex device is modeled correctly with this approach.

Figure 9:
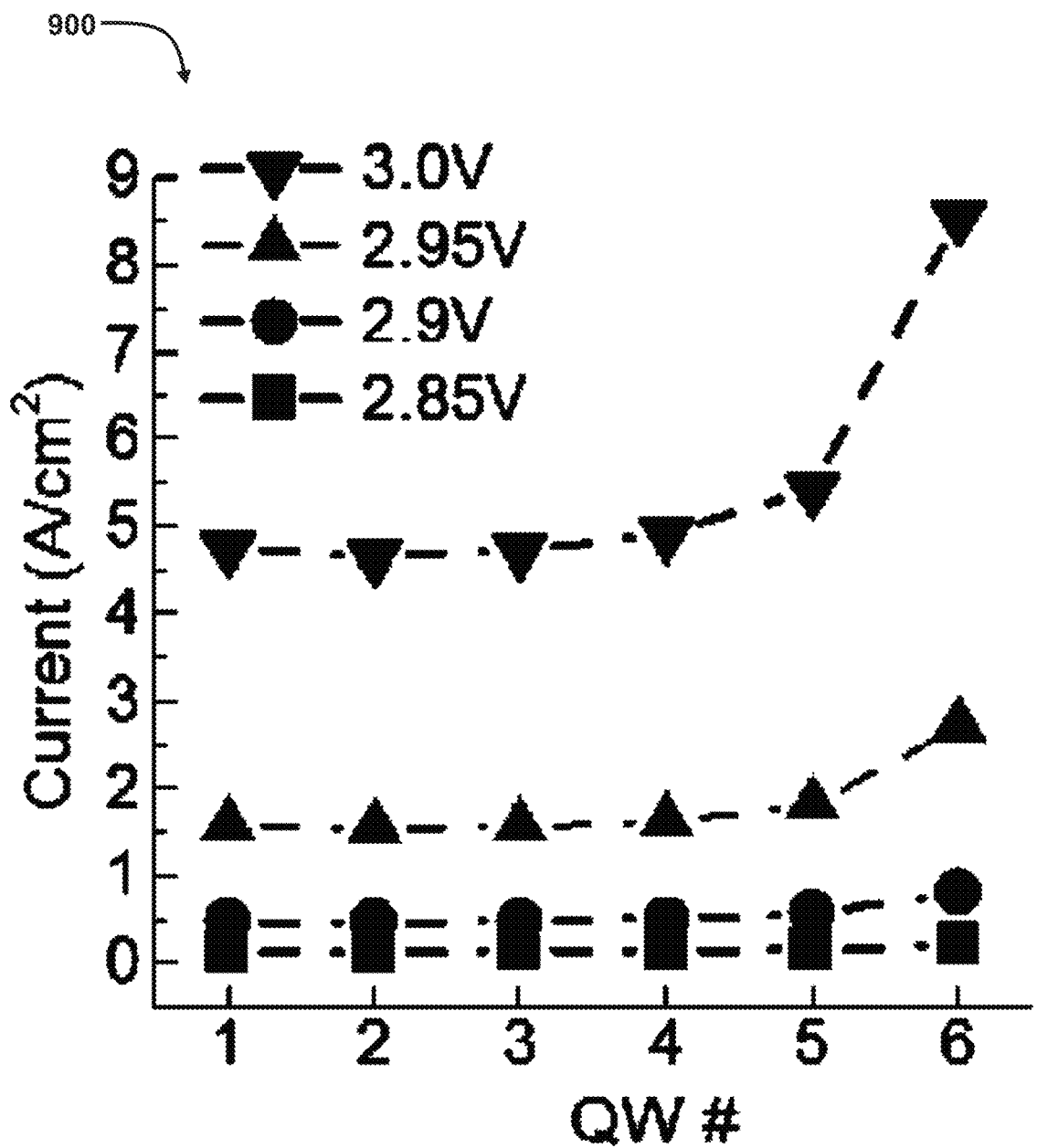
FIG. 9 shows a data plot comparing a current of each individual quantum well region at different bias voltages.

FIG. 9 shows a data plot 900 comparing a current of each individual quantum well region 1-6 at different bias voltages (i.e. 2.85V, 2.9V, 2.95 V, and 3.0V). As can be seen, unlike with conventional semi-classical-based models, the simulation results confirm the known phenomenon in which p-side quantum well region 6 emits photons more strongly than the other quantum well regions 1-5.

As discussed above and illustrated in the figures, the herein described method of determining carrier transport characteristics of a light emitting diode improves the functioning of the nanoelectronics simulation system 100 by enabling the processor circuitry/logic 104 to treat certain portions of the light emitting diode 200 as reservoirs in local equilibrium which serve as injectors and receptors of carriers into the neighboring reservoirs through tunneling and thermionic emission. The partitioning of the light emitting diode 200 also enables the nonequilibrium Green's function (NEGF) formalism to be utilized in more numerically efficient manner to compute carrier transport characteristics or other physical phenomena within the light emitting diode 200. The model 122 produces quantitative agreement with experimental I-V characteristics. Gaining physical insights into local quasi Fermi level drops, state-to-state coupling and broadening, and the importance of tunneling open opportunities for design optimization.

A computer program product implementing an embodiment disclosed herein may comprise one or more computer-readable storage media storing computer instructions executable by a processor to provide an embodiment of a system or perform an embodiment of a method disclosed herein. Computer instructions (e.g., the nanoelectronics simulation program 114 including the LED simulation model 122) may be provided by lines of code in any of various languages as will be recognized by those of ordinary skill in the art. A "non-transitory computer-readable medium" may be any type of data storage medium that may store computer instructions, including, but not limited to a memory card, ROM, RAM, write-capable memories, read-only memories, hard drives, discs, flash memory, or any of various other computer-readable medium.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of determining carrier transport characteristics of a light emitting diode, the method comprising:
receiving, with at least one processor, structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions;
identifying, with the at least one processor, local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region;
calculating, with the at least one processor, a Hamiltonian of the light emitting diode, the Hamiltonian of the light emitting diode being a sum of (i) a Hamiltonian of the n-doped lead region, (ii) a Hamiltonian of each of the plurality of quantum barrier regions of the multi-quantum-well region, (iii) a Hamiltonian of each of the plurality of quantum well regions of the multi-quantum-well region, and (iv) a Hamiltonian of the p-doped lead region;
calculating, with the at least one processor, a retarded Green's function of the light emitting diode by recursively inverting an equation having a particle energy term and the Hamiltonian of the light emitting diode;
calculating, with the at least one processor, a lesser Green's function using the retarded Green's function, the lesser Green's function being calculated differently for local equilibrium regions compared to the non-equilibrium regions; and
calculating, with the at least one processor, at least one of carrier densities and current densities at positions within the multi-quantum-well region using the lesser Green's function.

2. The method of claim 1, the calculating the lesser Green's function further comprising:
for local equilibrium regions of the light emitting diode, calculating the lesser Green's function using a local Fermi level.

3. The method of claim 1, the calculating the lesser Green's function further comprising:
for non-equilibrium regions of the light emitting diode, calculating the lesser Green's function using a contact self-energy of the respective region due to coupling with neighboring local equilibrium regions.

4. The method of claim 1 further comprising:
calculating, with the at least one processor, at least one of a recombination current and a generation current of the multi-quantum-well region.

5. The method of claim 4, the calculating of the at least one of the recombination current and the generation current further comprising:
for local equilibrium regions of the light emitting diode, setting electron and hole Fermi levels such that a sum of an inflow current density, an outflow current density, and the at least one of the recombination current and the generation density is equal to zero.

6. The method of claim 1, the calculating of the Hamiltonian of the light emitting diode further comprising:
including an optical potential in a diagonal of the Hamiltonian of each of the plurality of quantum well regions of the multi-quantum-well region, the optical potential matching experimental photoluminescent emission widths.

7. The method of claim 1, wherein the structural and material parameters define that the p-doped lead region of the light emitting diode includes an electron-blocking layer region.

8. The method of claim 1 further comprising:
calculating, with the at least one processor, I-V characteristics of the lighting emitting diode based on the lesser Green's function.

9. The method of claim 8, wherein the structural and material parameters define that (i) the material of the n-doped lead region is GaN, (ii) the material of the p-doped lead region is GaN, (iii) the material of the plurality of quantum barrier regions is GaN, and (iv) the material of the plurality of quantum well regions is InGaN.

10. The method of claim 1, wherein the structural and material parameters define (i) a material, a geometry, and a doping of the n-doped lead region, (ii) a material, a geometry, and a doping of the p-doped lead region, (iii) a material, a geometry, and a doping of the plurality of quantum barrier regions and (iv) a material, a geometry, and a doping of the plurality of quantum well regions of the multi-quantum-well region.

11. The method of claim 1, the receiving of the structural and material parameters further comprising:
reading from a data storage device at least one simulation input deck and at least one material parameter file.

12. The method of claim 1 further comprising:
operating a display device to display a graphical depiction of the least one of the carrier densities and the current densities at positions within the multi-quantum-well region.

13. A non-transitory computer readable medium for determining carrier transport characteristics of a light emitting diode, the computer readable medium storing a plurality of instructions which are configured to, when executed, cause at least one processor to:
receive structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions;
identify local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region;
calculate a Hamiltonian of the light emitting diode, the Hamiltonian of the light emitting diode being a sum of (i) a Hamiltonian of the n-doped lead region, (ii) a Hamiltonian of each of the plurality of quantum barrier regions of the multi-quantum-well region, (iii) a Hamiltonian of each of the plurality of quantum well regions of the multi-quantum-well region, and (iv) a Hamiltonian of the p-doped lead region;
calculate a retarded Green's function of the light emitting diode by recursively inverting an equation having a particle energy term and the Hamiltonian of the light emitting diode;
calculate a lesser Green's function using the retarded Green's function, the lesser Green's function being calculated differently for local equilibrium regions compared to the non-equilibrium regions; and calculate at least one of carrier densities and current densities at positions within the multi-quantum-well region using the lesser Green's function.

14. The non-transitory computer readable medium of claim 13, the plurality of instructions being further configured to, when executed, cause at least one processor to:
for local equilibrium regions of the light emitting diode, calculate the lesser Green's function using a local Fermi level.

15. The non-transitory computer readable medium of claim 13, the plurality of instructions being further configured to, when executed, cause at least one processor to:
for non-equilibrium regions of the light emitting diode, calculate the lesser Green's function using a contact self-energy of the respective region due to coupling with neighboring local equilibrium regions.

16. The non-transitory computer readable medium of claim 13, the plurality of instructions being further configured to, when executed, cause at least one processor to:
calculate at least one of a recombination current and the generation current of the multi-quantum-well region.

17. The non-transitory computer readable medium of claim 16, the plurality of instructions being further configured to, when executed, cause at least one processor to:
for local equilibrium regions of the light emitting diode, calculate the at least one of the recombination current and the generation current by setting electron and hole Fermi levels such that a sum of an inflow current density, an outflow current density, and the at least one of the recombination current and the generation density is equal to zero.

18. The non-transitory computer readable medium of claim 13, the plurality of instructions being further configured to, when executed, cause at least one processor to:
include an optical potential in a diagonal of the Hamiltonian of each of the plurality of quantum well regions of the multi-quantum-well region, the optical potential matching experimental photoluminescent emission widths.

19. An apparatus for determining carrier transport characteristics of a light emitting diode, the apparatus comprising:
a data storage device configured to store (i) structural and material parameters of the light emitting diode and (ii) a plurality of instructions; and
at least one processor operably connected to the data storage device, the at least one processor being configured to execute the plurality of instructions on the data storage device to:
receive structural and material parameters of the light emitting diode, the structural and material parameters defining (i) an n-doped lead region of the light emitting diode, (ii) a p-doped lead region of the light emitting diode and (iii) a multi-quantum-well region of the light emitting diode arranged between the n-doped lead region and the p-doped lead region, the multi-quantum-well region having a plurality of quantum barrier regions interleaved with a plurality of quantum well regions;
identify local equilibrium regions and non-equilibrium regions of the light emitting diode, the local equilibrium regions at least including the plurality of quantum well regions of the multi-quantum-well region, the non-equilibrium regions at least including the plurality of quantum barrier regions of the multi-quantum-well region;

calculate a Hamiltonian of the light emitting diode, the Hamiltonian of the light emitting diode being a sum of (i) a Hamiltonian of the n-doped lead region, (ii) a Hamiltonian of each of the plurality of quantum barrier regions of the multi-quantum-well region, (iii) a Hamiltonian of each of the plurality of quantum well regions of the multi-quantum-well region, and (iv) a Hamiltonian of the p-doped lead region;

calculate a retarded Green's function of the light emitting diode by recursively inverting an equation having a particle energy term and the Hamiltonian of the light emitting diode;

calculate a lesser Green's function using the retarded Green's function, the lesser Green's function being calculated differently for local equilibrium regions compared to the non-equilibrium regions; and calculate at least one of carrier densities and current densities at positions within the multi-quantum-well region using the lesser Green's function.

20. The apparatus of claim 19 further comprising:
a display device,
wherein the at least one processor is further configured to execute the plurality of instructions on the data storage device to operate the display device to display a graphical depiction of the least one of the carrier densities and the current densities at positions within the multi-quantum-well region.

\* \* \* \* \*